United States Patent [19]
Kuehn, Jr.

[11] 3,983,903
[45] Oct. 5, 1976

[54] MULTIPLE ORIFICE ASSEMBLY

[75] Inventor: Walter Kuehn, Jr., West Hartford, Conn.

[73] Assignee: Combustion Engineering, Inc., Windsor, Conn.

[22] Filed: Dec. 23, 1974

[21] Appl. No.: 535,526

[52] U.S. Cl. .............................. 138/40; 122/406 B; 138/37
[51] Int. Cl.² ......................................... F15D 0/00
[58] Field of Search .............................. 138/37–40, 138/44, 92, 94; 122/492, 406 B

[56] References Cited
UNITED STATES PATENTS

| | | | |
|---|---|---|---|
| 1,988,659 | 1/1935 | La Mont | 122/406 B |
| 3,109,459 | 11/1963 | Lee et al. | 138/40 |
| 3,545,492 | 12/1970 | Scheid, Jr. | 138/44 X |
| 3,572,391 | 3/1971 | Hirsch | 138/40 |
| 3,665,895 | 5/1972 | Sauter | 122/406 B |
| 3,841,270 | 10/1974 | Sokolowski | 138/44 X |

Primary Examiner—Richard E. Aegerter
Assistant Examiner—Larry Jones
Attorney, Agent, or Firm—Robert L. Olson

[57] ABSTRACT

A multiple orifice assembly for increasing the flow resistance in a conduit for conducting fluid flow. The multiple orifice assembly comprises a plurality of orifices spacedly supported in the conduit and a diffuser which is supported intermediate adjacent orifices. The diffuser is spaced from the upstream orifice a distance less than that distance required for fluid issuing from the upstream orifice to fully expand back to the constraints of the conduit.

4 Claims, 12 Drawing Figures

MULTIPLE ORIFICE ASSEMBLY

BACKGROUND OF THE INVENTION

The present invention relates to orifice assemblies for fluid flow conduits and more particularly to orifice assemblies for increasing the resistance to fluid flowing through such conduits. The present invention has particular application in forced circulation steam generating units, but may be applied in any hydraulic system.

In steam generating units constructed to operate with forced circulation, a multiplicity of steam generating tubes are connected to a common header from which they receive their supply of water thereby forming a multiplicity of parallel tube circuits in which steam is generated. The common header may be connected to the discharge of the pump which receives its water from a steam and water separating drum. The tube circuits discharge the steam and water mixture into the steam and water separating drum.

In the past, orifices or other flow restricting means have been employed at the entrance of the multiplicity of tubes for controlling the distribution of water from the common header to the individual tube circuits. A high flow resistance is required to assure uniform flow distribution and prevention of flow reversals in shaded waterwall panels and flow starvation of adjacent tubes in the event of a single tube rupture. In connection with the latter aspect of prevention of flow starvation, the orifices serve to throttle or choke the flow to the ruptured steam generating tube. This then insures that the remaining mass flow from the common header will be distributed to the remaining, nonruptured, steam generating tubes.

As is well known in the art, choking of flow through an orifice is dependent on the pressure drop across the orifice which in turn is dependent on the fluid resistance presented by the orifice and the square of the flow rate through the orifice. For example, with a relatively high resistance presented by the orifice, the phenomenon of choking will occur at a lower mass flow rate than would occur with a lower resistance. Accordingly, it is highly desirable to achieve the greatest possible flow resistance of orifices so that should a steam generator tube rupture, a greater mass flow rate will be available for cooling of the remaining steam generator tubes served by the common header.

Set off against the desirability of increasing the flow resistance offered by an orifice is the fact that very small openings have a tendency to foul which itself has a very adverse effect upon operation of the steam generating unit. Accordingly, the problem presents itself as how to obtain a greater flow resistance than that obtainable with an orifice having the smallest opening conducive to anti-fouling operation.

One solution which has been suggested involves stacking of several orifices, each having the minimum opening allowed to prevent adverse effects of fouling. However, this has not proved workable because the flow issuing from an orifice requires a substantial distance downstream before it fully expands back to the constraints of a tube and as such requires a substantial spacing between adjacent orifices in order to take full advantage of the flow resistant characteristics of the orifices. This substantial spacing is not acceptable in steam generating units where it is desired to choke flow at the inlet to the steam generating tubes.

SUMMARY OF THE INVENTION

According to the present invention, there is provided a multiple orifice arrangement for increasing the flow resistance capacity while maintaining a minimum allowable aperture size so as to prevent or at least minimize possible fouling of the arrangement. The multiple orifice arrangement of the present invention comprises a plurality of orifices spacedly supported in a conduit for conducting fluid flow and a diffuser supported intermediate or between adjacent orifices. The intermediate diffusers are spaced from the upstream orifice a distance less than that distance required for the fluid issuing from the upstream orifice to fully expand back to the constraints of the conduit.

The diffuser serves to disturb or staighten out the flow issuing from the upstream orifice before it is subjected to the succeeding or the next downstream orifice. In this way, the flow issuing from the upstream orifice is forced out back against the constraints of the conduit and as such allows a substantial benefit in terms of pressure drop or flow resistance to be achieved with the downstream or succeeding orifices. Also, use of such an arrangement gives rise to the ability to analytically predict the performance of the multiple orifice assembly, which analysis has not been feasible using segmented or eccentric orifice arrangements.

DESCRIPTION OF THE PREFERRED EMBODIMENT

Figure 1:
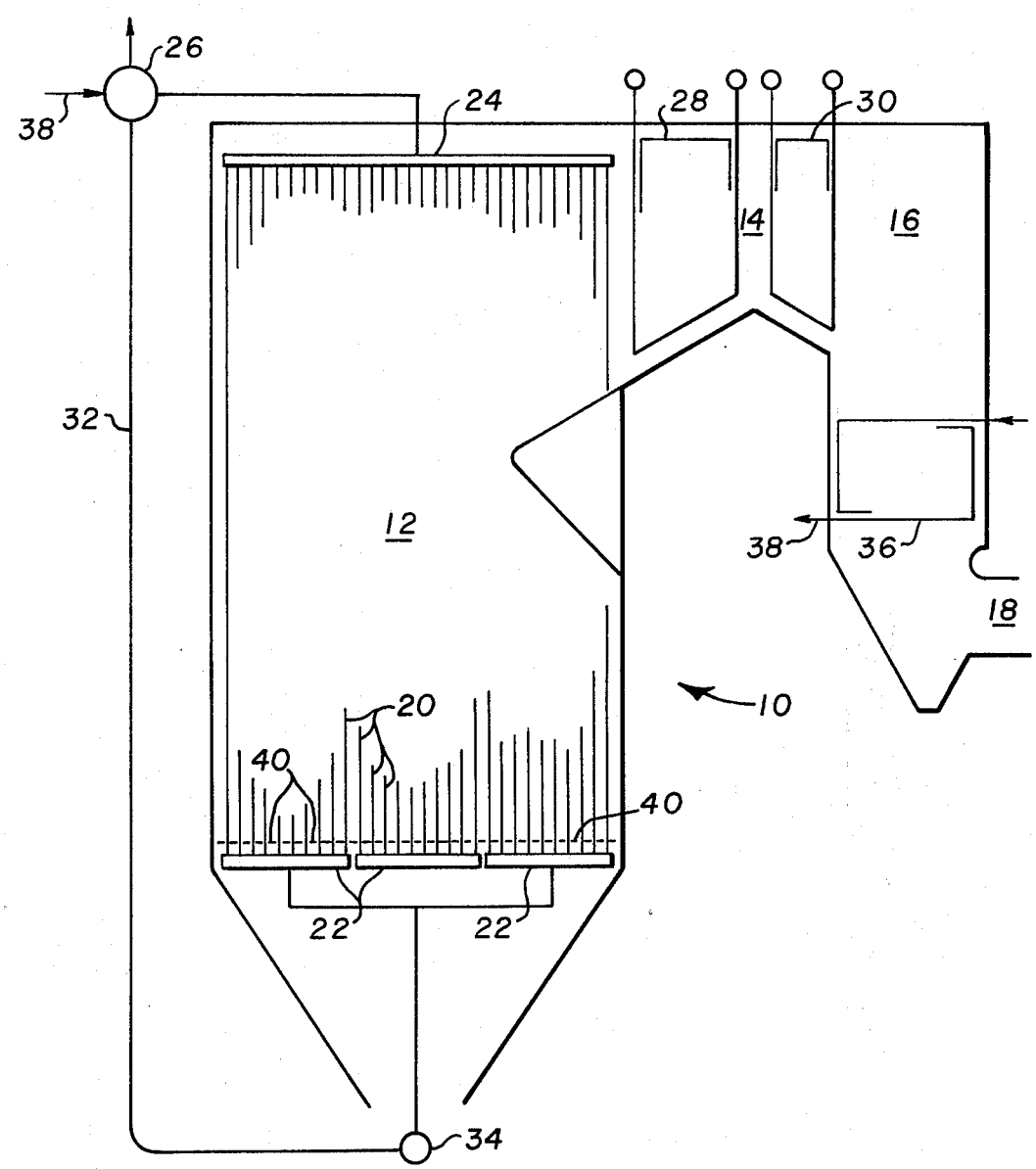
FIG. 1 is a schematic representation of a forced circulation steam generating unit in which the present invention is incorporated.

Referring now to the drawings, FIG. 1 illustrates a schematic representation of a typical forced flow steam generating unit 10 such as might be used in the production of electrical energy. The steam generating unit 10 illustrated comprises a generally vertically disposed furnace chamber 12 within which a fuel is burned by means of a burner (not shown) arranged to deliver an appropriate fuel such as oil or pulverized coal for combustion in a furnace in a well known manner. The hot combustion gases pass upwardly within the furnace chamber 12 to a horizontal gas pass 14 which communicates with the upper end of the furnace 12 and which also communicates with the upper end of a vertically disposed gas pass 16 leading downwardly to an outlet duct 18. The heated combustion gases serve to heat and thus vaporize water to produce substantial amounts of steam which may then be used in a well known manner to produce electrical power. The heating surface within the furnace 12 comprises a multiplicity of steam generating tubes 20 in parallel arrangement connected to common distribution headers 22 and passing thence upwardly along the wall of the furnace 12 to an outlet header 24. The outlet header 24 is connected to a steam and water separating drum 26 by appropriate conduits. In the steam and water separating drum 26 the steam and water mixture from the outlet header 24 is separated with the steam being withdrawn through appropriate conduits which in turn are connected to a plurality of heat exchange devices such as superheaters 28 and reheaters 30 disposed in the horizontal gas pass 14 for superheating of the steam. A downcomer 32 is connected at its upper end to the lower portion of the steam and water separating drum 26 for conducting the water therein to the inlet of a circulation pump 34. The pump 34 is connected at its discharge end to the common distribution headers 22 through appropriate conduits and as such serves to circulate the water from the drum 26 to the distribution headers 22, through the steam generating tubes 20 to the outlet header 24 and then back to steam and water separating drum 26. An economizer 36 may be provided in the downwardly extending vertical gas pass 16 for preheating of feedwater, the outlet 38 of the economizer 36 being connected to the steam and water separating drum 26 for introducing the heated water into the steam generating flow circuit.

As is well known, steam is generated within the steam generating tubes 20 lining the furnace chamber 12 by means of the circulating water or fluid absorbing the heat from the hot combustion gases flowing through the chamber 12 and the gas passes 14, 16. Also as is well known, the circulating water serves to cool the steam generating tubes 20 to prevent rupture or burn out thereof which otherwise would impair the integrity of the fluid circuit. Also, a plurality of common distribution headers 22 are generally provided each of which supplies water to only a portion of the steam generating tubes 20. This is to take account for different heat absorption rates in various sections of the furnace 12 as well as providing for more uniform flow distribution and a plurality of fluid circuits for preventing total burn out of the entire furnace 12 should one circuit develop a flow leakage.

As is well known in the art, orifices, generally 40, may be provided at the inlets to each of the steam generating tubes 20 for providing a relatively high flow resistance to assure uniform flow distribution, prevention of flow reversals in shaded waterwall panels and prevention of starvation of adjacent tubes 20 in the event of a single tube rupturing. For example, by providing a relatively high flow resistance at the inlets to the steam generating tubes 20, variations in water resistance in the remainder of the circuit will have a reduced influence upon the total resistance of a circuit and consequently upon the flow of water through the tube 20 and the circuit. Also, a high flow resistance produces choking or throttling of flow at a lower flow rate. Thus, if a steam generating tube 20 ruptures, the flow through such a tube 20 will be limited, thereby assuring a sufficient amount of flow for the remaining tubes 20 served by the common header 22 to prevent rupture or burn out of an entire waterwall panel.

As is well known, an increase in flow resistance, and accordingly pressure drop, can be achieved by decreasing the size of the opening or aperture of the orifice 40. However, experience has shown that fouling (deposition of foreign matter on the apertures of the orifice, thereby effecting a reduction in hole size) occurs with very small hole sizes. Accordingly, there is a general requirement that the aperture size for orifices be greater than a certain minimum allowable size in order to insure that such fouling will not occur. For example, in orifices for 1 inch diameter steam generating tubes, this minimum allowable aperture diameter for minimizing fouling is approximately three-eighths inch. As can be appreciated, such a minimum aperture size has resulted in a maximum obtainable pressure drop which can be realized with a given flow rate. Recently in the design of steam generating units, it has been desired to obtain a higher pressure drop across an orifice for a given flow rate and thus to obtain a higher flow resistance presented by the orifice. For example, it is desired to increase the flow resistance to that which may be obtained with a one-tenth inch diameter aperture opening for the orifice, and still insure that fouling does not occur. Also it is desired that this increased flow resistance be obtained with an orifice assembly which extends only a relatively short distance into the inlet of a steam generating tube 20 in order that the full effect of the increased flow resistance occur almost totally at the inlet.

Figure 2:
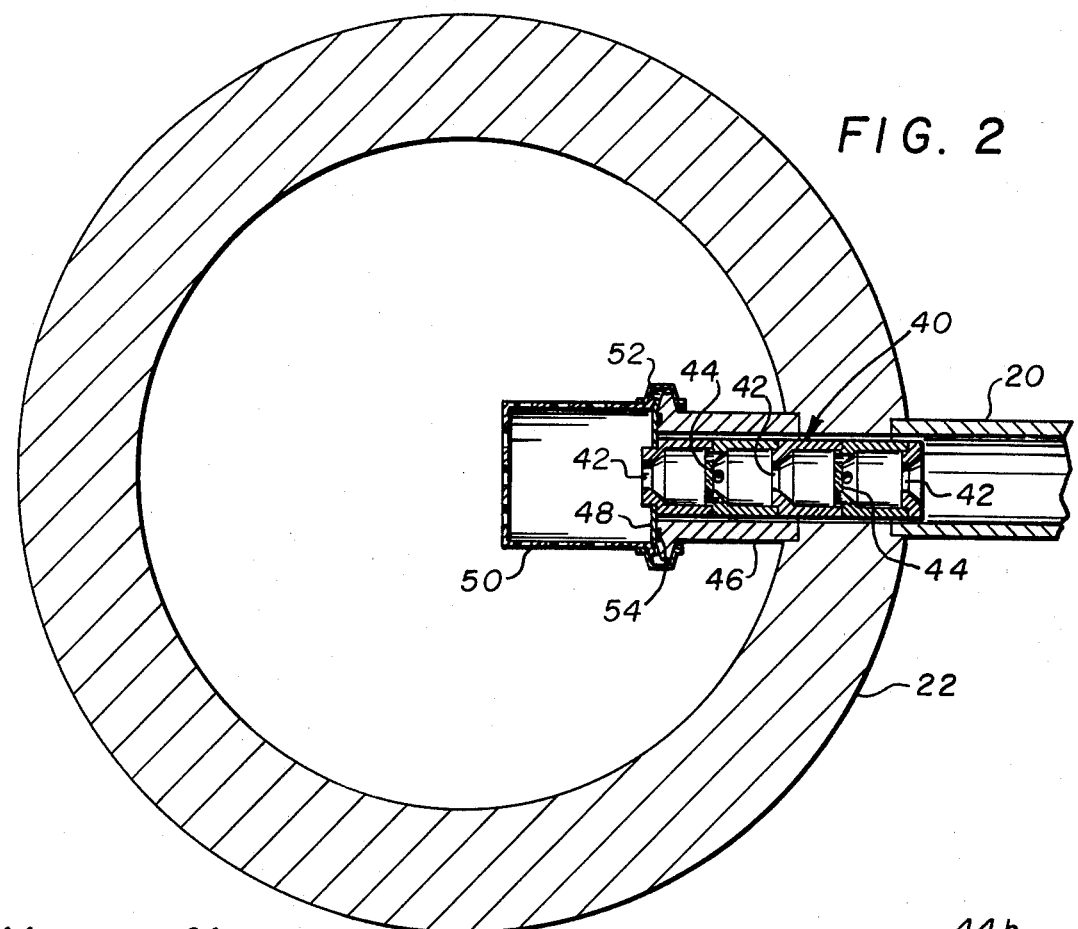
FIG. 2 is an enlarged sectional view of a header and steam generating tube in which the present invention is employed.

The present invention accomplishes such desired effects with the use of a plurality of orifices 42 and diffusers 44, the orifice openings being consistent with the minimum hole size requirements for preventing fouling and the diffusers 44 being spaced intermediate adjacent orifices 42. In particular, referring to FIGS. 2 and 3, there is disclosed an orifice assembly 40 constructed in accordance with the present invention which is positioned at the inlet end of a steam generating tube 20 connected to and communicating with the interior of a common distribution header 22. The distribution header 22 is cylindrically shaped and supplies coolant fluid to be vaporized, such as water, to a plurality of steam generating tubes 20 (only one shown in FIG. 2). The orifice assembly 40 is inserted into and supported by a tubular orifice mount adapter 46 integrally secured to the interior of the distribution header 22 and communicating with the interior of the steam generating tube 20 secured to the exterior of the header 22. An orifice mounting plate 48 affixed to the inlet end of the orifice assembly 40 is adapted to mate with the end surface of the mounting adapter 46 and as such serves to mount and support the orifice assembly 40 within the adapter 46. A strainer assembly 50 for preventing large particles of foreign material from plugging the orifice assembly 40 at the entrance to the steam generating circuits is also mounted to the orifice mounting adapter 46 by means of a clamp 52 which engages and holds together the outwardly flanged ends of the strainer 50 and mounting adapter 46, the orifice mounting plate 48 being sandwiched therebetween. In the preferred embodiment an appropriate sealing means 54, such as a neoprene gasket seal, is provided between the orifice mounting plate 48 and mounting adapter 46 to minimize leakage between the exterior of the assembly 40 and the interior of the adapter 46. Such leakage is undesirable as it may act to reduce the effectiveness of the assembly 40 in increasing the pressure drop between the distribution header 22 and the steam generating tubes 20. Alternatively, the mounting plate 48 and flanged end of the adapter 46 could be machined to provide an adequate seating surface to minimize the undesired leakage.

Figure 3:
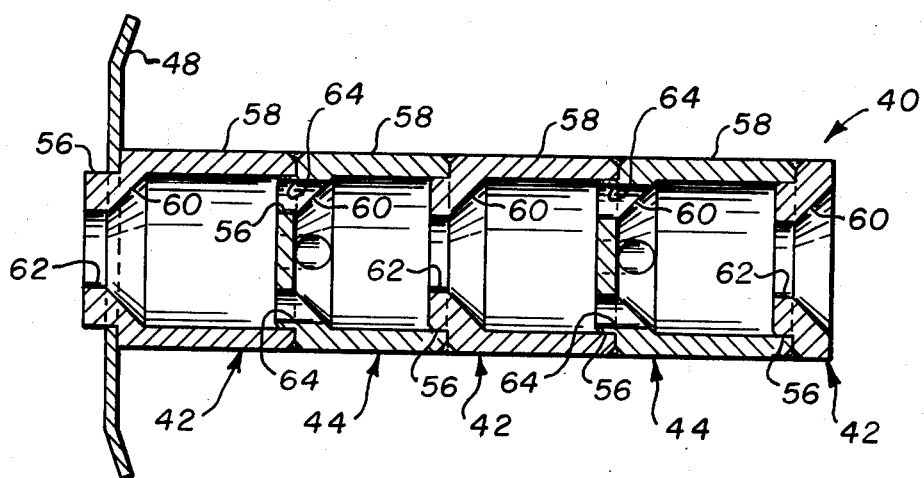
FIG. 3 is an enlarged sectional view of the multiple orifice assembly of the present invention.

As best seen in FIG. 3, the orifice assembly 40 of the preferred embodiment is comprised of three orifice segments 42 and two diffuser segments 44 integrally joined together, the diffuser segments 44 being placed intermediate adjacent orifices 42. Each of the orifice 42 and diffuser 44 sections is comprised of a hollow tubular, cylindrical member which includes a reduced neck portion 56 of a reduced outside diameter having the orifice or diffuser openings 62, 64 therethrough, and a spacer portion 58 having an enlarged inner diameter which communicates with the orifice or diffuser openings through a transition section 60 which is tapered to strengthen such transition.

The orifice sections 42 of the assembly comprise the first, third and fifth tubular members, the fifth member not including a spacer portion but terminating after the transition section 60. The diffuser sections 44 comprise the second and fourth members of the orifice assembly 40. In assembling the orifice assembly 40, the reduced neck portions 56 of the tubular members are inserted into the outlets of the spacer portions 58 of the preceding or forward members and welded thereto. The orifice mounting plate 48 is integrally affixed such as by welding to the reduced neck portion 56 of the first orifice segment 42.

Figure 4:
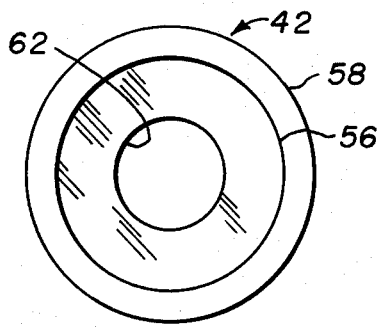
FIG. 4 is an enlarged plan view of an orifice plate employed in the present invention.
Figure 5:
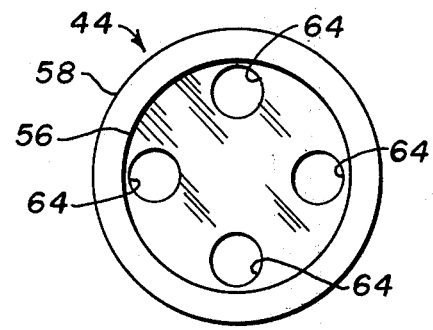
FIG. 5 is an enlarged plan view of a diffuser plate employed in the present invention.

As best seen in FIGS. 4 and 5, each of the orifice segments 42 includes a central aperture 62 through the reduced neck portion 56, the size of the aperture being such as to be conducive with the anti-fouling requirements of the orifice assembly 40. For (1 inch) diameter steam generating tubes 20, this aperture is sized as three-eighths inch with the outer diameter of each tubular member being just under (1 inch). The inner diameter of the spacer portion 58 of each tubular member is approximately three-fourths inch which corresponds with the outer diameter of the reduced neck portions 56. In the preferred embodiment the diffuser segments 44 (which may be referred to as "shower head" diffusers) are as described hereinabove and include four apertures 64 spaced about the periphery of the reduced neck portion 56. For the dimensions of the tubular members given hereinabove, the hole sizes for each of the apertures 64 may vary from approximately one-fifth inch diameter to approximately one-fourth inch diameter, this specific size depending on a variety of circumstances which may include consideration of fouling of the diffuser plate apertures 64 and the effectiveness of the diffuser 44 to straighten out the flow therethrough. An aperture size of fifteen sixty-fourths inch diameter is shown in FIG. 5.

Figure 6:
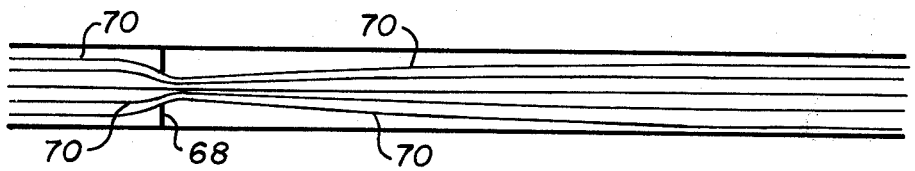
FIG. 6 is a schematic representation of a single orifice analysis showing the flow lines assumed by the flow in a conduit having a single orifice.

The minimum spacing between the orifices 42 and diffusers 44 is an important factor to be considered in providing an effective arrangement to significantly increase the fluid resistance of the orifice assembly 40. To understand this, it is first necessary to understand the phenomenon of flow through a single orifice such as depicted in FIG. 6. As the flow in a conduit approaches a single orifice (designated 68 in FIG. 6), it is accelerated and the outer flow lines 70 develop an inward velocity. At the edge of the orifice 68 the flow separates and the high inward velocity causes a jet to form with continued contraction of the effected flow area downstream. At some point downstream the jet begins to dissipate and the flow lines 70 return to the constraints of the containing vessel. As is well known in the art, this return to fully developed flow occurs approximately (10) pipe diameters downstream of the orifice 68 where one pipe diameter corresponds to the inner diameter of the conduit in which the orifice 68 is placed. By placing a diffuser at some point downstream of the orifice, the flow will be forced back against the constraints of the conduit, thereby returning to its fully developed state. However, by placing the diffuser too closely downstream from the orifice, it is postulated that the arrangement will merely act as a segmented orifice or a series of closely spaced, eccentrically arranged orifices, which, as is well known, do not permit analytical prediction of the flow resistance of the arrangement. The minimum spacing which is necessary for the present invention to be effective is that which allows the flow issuing from the upstream orifice to begin to dissipate before it engages the diffuser section. This has been postulated to be approximately one-half pipe diameter downstream from the orifice. In the preferred embodiment, the spacing between the orifices 42 and diffusers 44, both upstream and downstream, is approximately (1) pipe diameter which, for the dimensions suggested hereinabove for the steam generating tubes, corresponds to a (1 inch) spacing.

Figure 7:
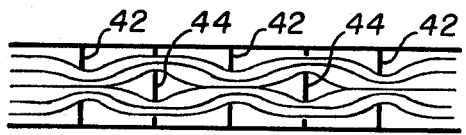
FIG. 7 is a schematic representation of a multiple orifice assembly analysis showing the flow lines assumed by the flow in a conduit having the multiple orifice assembly in accordance with the present invention.

Another advantage of the present invention is the fact that the flow pattern through and the flow resistance of the orifice assembly 40 may be readily and easily analyzed. A schematic flow pattern analysis of the preferred assembly having three orifices 42 and two diffusers 44 is shown in FIG. 7. As can be seen in this figure, each diffuser segment 44 acts to disturb the developed jet issuing from the upstream orifice 42 in a determinable fashion to divert the flow outwardly back against the constraints of the conduit. In this way, the next downstream orifice 42 will present a higher flow resistance than would otherwise be obtainable in the absence of the diffuser 44. It is to be noted that the diffuser 44 does not effect the flow through the upstream orifice 42 but instead its only effect is on the flow resistance through the downstream orifice 42. Also, it is to be noted that from test results the increased flow resistance of the orifice assembly 40 can be determined in terms of the individual flow resistances of the orifices 42. For example, with the preferred spacing of one pipe diameter and with the preferred diffuser 44 as shown in FIG. 5, the effective flow resistance of the arrangement is approximately equivalent to the sum of the flow resistances of each of the orifices 42. That is, for the three-orifice, two-diffuser arrangement, the flow resistance is approximately equal to three times the flow resistance of a single orifice 42. Furthermore, this threefold increase is obtainable with a relatively close coupling of orifices 42 and diffusers 44.

Figure 8A:
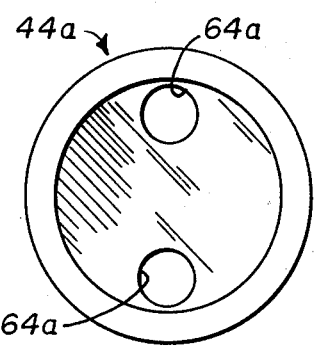
FIGS. 8a – 8e depict alternative diffuser plate arrangements which may be employed in the present invention.
Figure 8B:
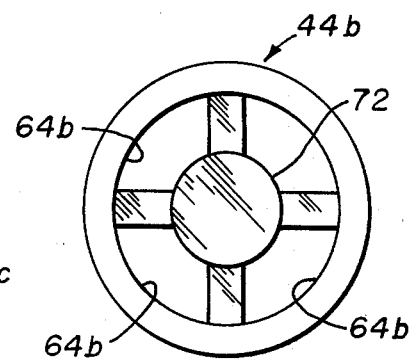
Figure 8C:
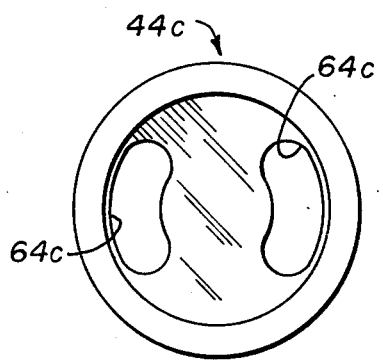
Figure 8D:
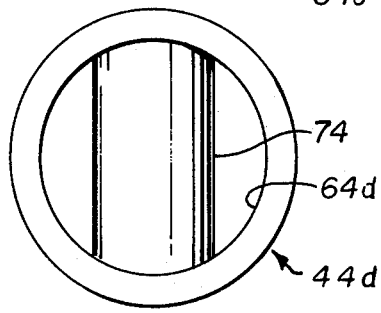
Figure 8E:
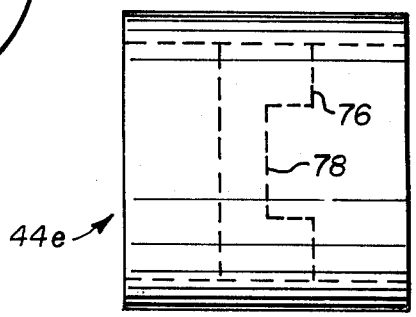

As is apparent, the shower head type diffuser 44 as depicted in FIG. 5 is not the only means for adequately disturbing the developed jet issuing from an orifice 42 in order to permit the close coupling of single orifices 42. Examples of other arrangements for the diffuser plates 44 which will also permit close coupling of the orifices 42 are shown in FIGS. 8a through 8e, the diffusers being designated as 44a, 44b, 44c, 44d and 44e respectively. These alternative diffuser arrangements are not as predictable in increasing the flow resistance of the orifice assembly 40 but they do operate to divert the flow back against the constraints of the conduit and may be desired for other reasons such as reducing the possibility of fouling of the assembly 40. FIG. 8a depicts a plan view of a diffuser plate 44a having two apertures 64a therein spaced near the periphery of the plate, this being known as a "two hole shower head" diffuser. FIG. 8b depicts a "wagon wheel" diffuser 44b in which the flow therethrough is divided into four quadrants near the periphery of the arrangement, the central circular portion 72, which acts to block the flow, being approximately sized to be equivalent with the size of the aperture 62 through an upstream orifice section. FIG. 8c is known as a "parenthesis" type diffuser 44c in which the flow is forced outwardly to the constraints of the conduit through two kidney shaped openings 64c in the plate. FIG. 8d is known as a cylinder diffuser 44d in which a cylindrical member 74 is placed in the flow path of the conduit to force the fluid to flow around the outside surface thereof. FIG. 8e shows a diffuser 44e which is similar to that shown in FIG. 8d with the exception that the cylinder section 76 has been machined to provide a flat surface 78 on which the flow strikes as it issued from the upstream orifice. As is apparent these are only a few of the possible arrangements for diffusers 44 which may be employed in the present invention in order to derive the benfits of increased flow resistance with close coupling of a plurality of orifices 42. In each situation, the diffusers 44 will be placed intermediate or between adjacent orifices 42 and will act to diffuse or force the flow issuing from an upstream orifice 42 outwardly back against the constraints of the conduit.

As can be appreciated from the discussion hereinabove, the effectiveness of any particular diffuser 44 is dependent on the spacing between the upstream orifice 42 and the diffuser 44. That is, as the spacing is increased, the effectiveness of the diffuser 44 to divert the flow back against the constraints of the conduit is increased. This dependence on spacing varies for each of the particular diffusers 44 described hereinabove. Accordingly, the total flow resistance of an assembly can be increased by simply increasing the spacing between upstream orifices 42 and the diffusers 44. This then allows the use of less effective diffusers 44 without sacrificing flow resistance of the assembly 40.

Accordingly, there is disclosed herein a novel orifice assembly 40 which, although it may be used in any hydraulic network, has particular application in steam generating units 10 to increase the flow resistance and permit close coupling of single orifices 42 at the entrance to steam generating tube circuits. The novel orifice assemblies 40 are each comprised of a plurality of orifices 42 spacedly supported within a conduit such as a steam generating tube 20, and a diffuser 44 spaced intermediate two adjacent orifices 42, the spacing of the diffuser 44 from the upstream orifice 42 being less than that distance which is required for flow issuing from the orifice 42 to fully develop back to the constraints imposed by the conduit. With such an arrangement an increased flow resistance through the assembly 40 can be obtained with a relatively close coupling of orifices 42. The effective aperture size of the resulting orifice assembly 40 is less than that size which is conducive to anti-fouling characteristics.

It will be understood that the embodiments shown and described herein are merely illustrative and that changes may be made without departing from the scope of the invention. What is sought to be protected herein is that which is recited in the appended claims.

What is claimed is:

1. In combination, a conduit for conducting fluid flow, a multiple orifice assembly for increasing the flow resistance in the conduit comprising, two orifice plates spacedly supported in the conduit, one orifice plate being upstream in a fluid flow sense to the other orifice plate, each orifice plate having a single, centrally located opening therethrough; and a diffuser plate positioned intermediate the two orifice plates, said diffuser plate having a solid, impermeable, central portion, said diffuser plate further having at least two openings therethrough, said diffuser plate being spaced from the upstream orifice plate a distance less than that distance required for fluid issuing from said upstream orifice plate to fully expand back to the constraints of the conduit.

2. The combination set forth in claim 1, wherein said diffuser plate is spaced from said upstream orifice plate a distance equivalent to one diameter of said conduit.

3. The combination set forth in claim 2 wherein said other orifice plate is spaced one diameter of said conduit from said diffuser plate.

4. In a forced circulation steam generating unit having a plurality of steam generating tubes, a common header connected to said multplicity of steam generating tubes for delivering a supply of water to said tubes, a steam and water separating drum operatively connected to the discharge end of said multiplicity of steam generating tubes, and a pump connected to said steam and water separating drum and said common header for receiving water from said steam and water separating drum and delivering it to said common header, an improved multiple orifice assembly for the entrance of each of said multiplicity of steam generating tubes, each of said multiple orifice assemblies comprising two orifice plates spacedly supported in each of said steam generating tubes, each orifice plate having a single centrally located opening therethrough, one orifice plate being upsteam in a fluid flow sense to the other orifice plate, and a diffuser plate supported intermediate the orifice plates, said diffuser plate having a solid, impermeable, central portion, said diffuser plate further having at least two openings therethrough, said diffuser plate being spaced from the upstream orifice plate a distance less than that distance required for fluid issuing from said upstream orifice plate to fully expand back to the constraints of the tube.

* * * * *